United States Patent [19]
Yokono et al.

[11] 3,984,376
[45] Oct. 5, 1976

[54] THERMOSETTING RESIN COMPOSITIONS PREPARED FROM ISOCYANATES AND EPOXYPHENOLS

[75] Inventors: Hitoshi Yokono, Katsuta; Shunichi Numata, Hitachi; Kazuo Goto, Hitachi; Masahiko Sakai, Hitachi; Toshikazu Narahara, Hitachi; Junji Mukai, Hitachi, all of Japan

[73] Assignee: Hitachi, Ltd., Japan

[22] Filed: June 25, 1974

[21] Appl. No.: 483,044

[52] U.S. Cl. .................. 260/47 EP; 260/37 EP; 260/37 N; 260/47 CB; 260/49; 260/50; 260/831; 260/838
[51] Int. Cl.² .................. C08G 18/06; C08G 18/58
[58] Field of Search ............ 260/47 CB, 831, 838, 260/47 EP, 248 R, 307 A, 49, 50, 47 EN

[56] References Cited
UNITED STATES PATENTS

| | | |
|---|---|---|
| 2,946,767 | 7/1960 | Gassmann .................. 260/47 |
| 3,020,262 | 2/1962 | Speranza .................. 260/47 |
| 3,471,442 | 10/1969 | DiLeone .................. 260/47 |
| 3,682,845 | 8/1972 | Longley et al. .......... 260/2.5 AP |

*Primary Examiner*—Lester L. Lee
*Attorney, Agent, or Firm*—Craig & Antonelli

[57] ABSTRACT

Thermosetting resin compositions are obtained by mixing a resinous addition product produced by reacting an isocyanate compound having a molecular weight of 100 to 2000 and containing at least two isocyanate groups in its molecule with an epoxyphenol compound represented by the formula,

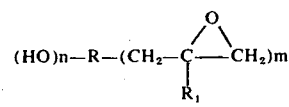

wherein R is a bi- or more valent group containing phenyl, $R_1$ is hydrogen, methyl or ethyl, $m$ and $n$ each are an integer of 1–8, and optionally an ordinary thermosetting epoxy resin, and 0.01 to 10 % by weight of a basic heterocycle forming catalyst based on the weight of said resinous addition product, said isocyanate compound and said epoxyphenol compound being blended so that said OH group may be present in an amount of ⅓ to 1 equivalent per equivalent of said isocyanate group and said epoxy group may be present in an amount of one-fifth to two-thirds equivalent per equivalent of said isocyanate group. The said addition product can be converted into a stable B-stage and is particularly useful as a varnish for prepreg.

22 Claims, No Drawings

THERMOSETTING RESIN COMPOSITIONS PREPARED FROM ISOCYANATES AND EPOXYPHENOLS

The present invention relates to novel thermosetting resin compositions, and more particularly relates to cured products containing an isocyanurate bond and an oxazolidone bond and thermosetting resin compositions which may give such cured products.

Laminated materials have heretofore been produced by impregnating paper, glass cloth or the like with a thermosetting resin, for example, phenolic or epoxy resin to prepare a B-stage prepreg, and then subjecting the prepreg to lamination and pressure forming. Also, the prepreg can also be used as an insulating tape for a coil of a rotary machine and a varnish treatment step can be advantageously omitted thereby.

Also, molded materials have heretofore been produced by heat-mixing a mixture consisting of a thermosetting resin, a filler, a mold releasing agent, a coloring agent and the like to form a B-stage composition, and charging under pressure the composition into a heated metal mold in a molding machine, and then curing the composition. Thus, the preparation of a B-stage thermosetting resin composition is an indispensable requisite in the art.

The present inventors previously provided a novel thermosetting resin composition having high thermal resistance and toughness as an organic material. (U.S. patent application Ser. No. 418,905 filed on Nov. 26, 1973 and West German Patent Application No. P2359386.4 filed on Nov. 28, 1973). It is a composition consisting of one equivalent of a polyfunctional epoxy compound, 1.5–5 equivalents of a polyfunctional isocyanate compound and a heterocycle forming catalyst which can produce an isocyanurate bond and an oxazolidone bond merely by heating to yield a cured product of a three-dimensional structure.

As the above-mentioned composition contains an isocyanate compound, however, the isocyanate group is affected by moisture to form an amic acid bond or a urea bond and the objective cured product becomes to be unable to be obtained. Therefore, it is indispensable to intercept moisture, and particularly moisture during storage. The composition itself produces no problem since moisture can be easily intercepted by sealing the container. However, the interception of moisture is practically difficult in the above-mentioned prepreg or molding material.

Also, as the activity of the isocyanate group is very high, the reaction proceeds in the presence of a catalyst even at ordinary temperature even if moisture can be sufficiently intercepted. A stable B-stage resin cannot be obtained and the shelf life of the composition is short. It is possible to add a catalyst directly before the use of the composition according to use, but it is practically difficult in the case of the prepreg or molding material.

An object of the present invention is to provide a novel thermosetting resin composition in which such an effect of moisture has been diminished and which contains an isocyanate compound stable at B-stage.

Another object of the invention is to provide a B-stage resin composition obtained by partially curing such a thermosetting resin composition.

Another object of the invention is to provide a prepreg consisting of a fibrous base material and such a thermosetting resin composition.

A still further object of the invention is to provide a molding powder material consisting of an inorganic filler and such a thermosetting resin composition.

Further objects and advantages of the invention will become apparent from the following description.

According to the present invention, a thermosetting resin composition comprising a reaction product of an isocyanate compound having a molecular weight of 100 to 2000 and containing at least two isocyanate groups in its molecule with an epoxyphenol compound represented by the formula,

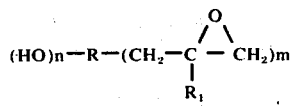

wherein R is a bi- or more valent group containing phenyl, $R_1$ is hydrogen, methyl or ethyl, $m$ and $n$ each are an integer of 1–8, and 0.01 to 10% by weight of a basic heterocycle forming catalyst based on the weight of said reaction product, said isocyanate compound and said epoxyphenol compound being blended so that said OH group may be present in an amount of ⅓ to 1 equivalent per equivalent of said isocyanate group and said epoxy group may be present in an amount of one-fifth to two-thirds equivalent per equivalent of said isocyanate group, is provided.

It is possible to mix up to one-half equivalent of a monofunctional isocyanate compound with a polyfunctional isocyanate compound to reduce the cross-linking degree of the cured product. It is also possible to add an ordinary polyfunctional epoxy compound containing no phenolic OH group within the range of blending ratio of isocyanate group, epoxy group and phenolic OH group as described below.

The essential feature of the present invention is to diminish the effect of moisture and increase the shelf life of the resulting composition at B-stage by masking part or all of the NCO group of the isocyanate compound by the phenolic OH group of the epoxyphenol compound.

In general, it is known to mask the NCO group of an isocyanate compound by reacting the isocyanate compound with a compound reactive with an isocyanate group to increase the stability to water of the isocyanate group. If mere masking is intended in the present invention, other groups than phenolic OH group such as, for example, a tertiary alcohol or polyamide can be used. However, they are high in cleavage temperature and inferior in curing reactivity. Further, it is most important that a cured product containing an oxazolidone ring and an isocyanurate ring and having excellent thermal resistance can be obtained in the presence of a heterocycle forming catalyst by the use of a polyfunctional epoxyphenol compound. In this respect, it is impossible to replace the polyfunctional epoxyphenol compound by any other masking agent. Of course, it is not necessary to form all the oxazolidone ring and isocyanurate ring by only the polyfunctional epoxyphenol compound as a masking agent. A polyfunctional epoxy compound having no phenolic OH group can be a main constituent for the formation of said heterocycle. However, it will be easily understood that a cured product having excellent thermal resistance can be obtained when the masking agent itself makes a contribution to the formation of the heterocycle.

The OH group of the epoxyphenol compound is reacted with an isocyanate group to form a urethane bond as shown by the formula, $$R'-NCO + HO-R \longrightarrow R'-NHC-O-R \quad (II)$$
$$\qquad\qquad\qquad\qquad\qquad \underset{O}{\|}$$

Thereby, the free NCO group is masked, the effect and activity of moisture absorbed are diminished, and the shelf life of the composition at B-stage is prolonged. The above-mentioned reaction can be effected at a temperature of up to 100°C in the absence of a catalyst. When the composition is heated to a temperature of 130°C or more in the subsequent curing reaction stage, the above-mentioned urethane bond is cleaved into original NCO group and OH group. The NCO group is polymerized to form an isocyanurate ring and reacted with the epoxy group to form an oxazolidone ring. On the one hand, the OH group is presumed to react with the epoxy group to form an ether bond. Also, it is presumed that a reaction between the epoxy groups naturally occurs. The curing mechanism of the composition is essentially the same as described in the above-mentioned prior applications. Therefore, detailed description thereof is here omitted to avoid repetition.

The epoxyphenol compounds which may be used in the present invention have at least one phenolic OH group and at least one vicinal epoxy group in their molecule and are exemplified by the following compounds:

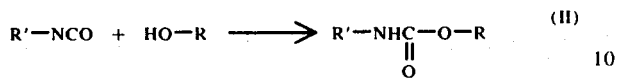

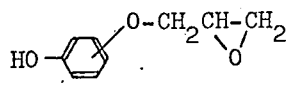

$n_1$: 2-6

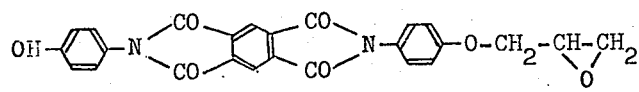, etc.

Also, compounds obtained by partly epoxidating the phenolic OH group of a phenolnovolac represented by the formula, $n_2$: 1 - 6 with epichlorohydrin may be used. Further, epoxyphenol compounds such as etc. may be used. Also, each of the above-mentioned epoxyphenol compounds may have a substituent such as methyl, ethyl, etc. in β-position of the glycidyl group.

When the above-mentioned epoxyphenol compounds are blended and reacted with an isocyanate compound in a blending ratio as described below, the isocyanate compound does not get a three dimensional structure. However, when the reaction product is converted into a B-stage resin and then cured by heating it in the presence of a heterocycle forming catalyst, a cured product of a three dimensional structure having thermal resistance is produced.

The polyfunctional isocyanates used in the present invention are compounds having two or more isocyanate groups in their molecule and are exemplified by bifunctional isocyanate compounds such as methanediisocyanate, butane-1,1-diisocyanate, ethane-1,2-diisocyanate, butane-1,2-diisocyanate, trans-vinylenediisocyanate, propane-1,3-diisocyanate, butane-1,4-diisocyanate, 2-butene-1,4-diisocyanate, 2-methylbutane-1,4-diisocyanate, pentane-1,5-diisocyanate, 2,2-dimethylpentane-1,5-diisocyanate, hexane-1,6-diisocyanate, heptane-1,7-diisocyanate, octane-1,8-diisocyanate, nonane-1,9-diisocyanate, decane-1,10-diisocyanate, dimethylsilanediisocyanate, diphenylsilanediisocyanate, $\omega,\omega'$-1,3-dimethylbenzenediisocyanate, $\omega,\omega'$-1,4-dimethylbenzenediisocyanate, $\omega,\omega'$-1,3-dimethylcyclohexanediisocyanate, $\omega,\omega'$-1,4-dimethylcyclohexanediisocyanate, $\omega,\omega'$-1,4-dimethylbenzenediisocyanate, $\omega,\omega'$-1,4-dimethylnaphthalenediisocyanate, $\omega,\omega'$-1,5-dimethylnaphthalenediisocyanate, cyclohexane-1,3-diisocyanate, cyclohexane-1,4-diisocyanate, dicyclohexylmethane-4,4'-diisocyanate, 1,3-phenylenediisocyanate, 1,4-phenylenediisocyanate, 1-methylbenzene-2,4-diisocyanate, 1-methylbenzene-2,5-diisocyanate, 1-methylbenzene-2,6-diisocyanate, 1-methylbenzene-3,5-diisocyanate, diphenylether-4,4'-diisocyanate, diphenylether-2,4'-diisocyanate, naphthalene-1,4-diisocyanate, naphthalene-1,5-diisocyanate, 3,3'-dimethylbiphenyl-4,4'-diisocyanate, 2,3'-dimethoxybiphenyl-4,4'-diisocyanate, diphenylmethane-4,4'-diisocyanate, 3,3'-dimethoxydiphenylmethane-4,4'-diisocyanate, 4,4'-dimethoxydiphenylmethane-3,3'-diisocyanate, diphenylsulfide-4,4'-diisocyanate, diphenylsulfone-4,4'-diisocyanate, etc. and tri- or more functional compounds such as polymethylenepolyphenylisocyanate, triphenylmethanetriisocyanate, tris (4-phenylisocyanatethiophosphate), 3,3',4,4'-diphenylmethanetetraisocyanate, etc.

Also, dimers and trimers of these isocyanate compounds may be used. The above-mentioned epoxyphenol compounds and isocyanate compounds are respectively used alone or as a mixture of two or more thereof.

The molecular weight of the isocyanate compounds may be 1000 or less, but prepolymers of the isocyanate compound and the epoxy compound which contain two isocyanate groups at their terminal may be used. The molecular weight of such prepolymers may be higher and may be up to about 2000. It is necessary that, when the isocyanate compound is reacted with the said epoxyphenol compound and the reaction product is converted into a B-stage resin, the B-stage resin apparently remains in the form of a solid. Therefore, isocyanate compounds having a molecular weight of 100 or more must be selected. Practically, isocyanate compounds having a molecular weight of 150 to about 800 are commercially available and are easy to use.

On the one hand, it is necessary that the epoxyphenol compounds have a molecular weight of 100 to 2000. Of course, when a reaction product thereof with an isocyanate is converted into a B-stage resin, the resin must be apparently in the form of a solid. Practically, epoxyphenol compounds having a molecular weight of 130 to 1000 are particularly preferable.

The polyfunctional epoxy compounds used in the present invention are those containing two or more epoxy groups in their molecule and are exemplified by bifunctional epoxy compounds such as, for example, diglycidylether of bisphenol A, butadiene diepoxide, 3,4-epoxycyclohexylmethyl (3,4-epoxy) cyclohexane carboxylate, vinylcyclohexene dioxide, 4,4'-di(1,2-epoxyethyl) diphenylether, 4,4'-di(1,2-epoxyethyl)-biphenyl, 2,2-bis(3,4-epoxycyclohexyl)propane, diglycidylether of resorcinol, diglycidylether of phloroglucinol, diglycidylether of methylphloroglucinol, bis(2,3-epoxycyclopentyl)ether, 2-(3,4-epoxy)cyclohexane-5,5-spiro(3,4-epoxy)-cyclohexane-m-dioxane, bis(3,4-epoxy-6-methylcyclohexyl)adipate, N,N'-m-phenylene bis(4,5-epoxy-1,2-cyclohexanedicarboximide), etc. and tri- or more functional epoxy compounds such as, for example, triglycidylether of p-aminophenol, polyallylglycidylether, 1,3,5-tri-(1,2-epoxyethyl)benzene, 2,2',4,4'-tetraglycidoxybenzophenone, tetraglycidoxytetraphenylethane, polyglycidylether of phenol-formaldehyde novolac, triglycidylether of glycerol, triglycidylether of trimethylolpropane, etc. With respect to the other epoxy compounds, a book entitled "Epoxy Resins" (American Chemical Society, 1970) written by Henry Lee and a book entitled "Handbook of Epoxy Resin" (McGraw-Hill Book Co., 1967) written by Henry Lee and K. Neville contain the descriptions of the resins.

Among the aforesaid polyfunctional epoxides, the diglycidylether of bisphenol A and the polyglycidylether of phenol-formaldehyde novolac have particularly high reactivity. Therefore, they are useful compounds. Further, the halides of these compounds can also be used.

It is necessary for effecting cross-linkage that the blending ratio of the NCO group of the polyfunctional isocyanate to the total epoxy group of the epoxyphenol compound and polyfunctional epoxy compound is two-thirds equivalent or less of the latter per equivalent of the former. Also, if the amount of the total epoxy group is less than one-fifth equivalent, the cured product tends to become remarkably brittle.

Also, the OH group of the above-mentioned epoxyphenol compounds is blended in an amount of ⅓ – 1 equivalent per equivalent of isocyanate group. If the amount of the OH group is less than ⅓ equivalent, the masking effect becomes remarkably low.

The catalysts used in the compositions of the present invention play an important part. Basic heterocycle forming catalysts which form an isocyanurate bond and an oxazolidone bond on curing are used. Acid catalysts cannot form the isocyanurate bond and oxazolidone bond. Such useful catalysts are exemplified by tertiary amines such as trimethylamine, triethylamine, tetramethylbutanediamine, tetramethylpentanediamine, tetramethylhexanediamine, etc. and hydroxyalkyl amines such as dimethylaminoethanol, dimethylaminopentanol, etc. and various amines such as dimethylaniline, trisdimethylaminomethylphenol (DMP-30), N-methylmorpholine, N-ethylmorpholine, triethylenediamine, etc.

Further, quaternary ammonium salts such as cetyltrimethylammonium bromide, cetyltrimethylammonium chloride, dodecyltrimethylammonium iodide, trimethyldodecylammonium chloride, benzyldimethyltetradecylammonium chloride, benzyldimethylpalmitylammonium chloride, allylcoconuttrimethylammonium bromide, benzylmethylstearylammonium bromide, stearyltrimethylammonium chloride, benzyldimethyltetradecylammonium acetylate, etc. are useful as such a catalyst. Also, imidazoles such as 2-methylimidazole, 2-ethylimidazole, 2- undecylimidazole, 2-heptadecylimidazole, 2-methyl-4-ethylimidazole, 1-butylimidazole, 1-propyl-2-methylimidazole, 1-benzyl-2-methylimidazole, 1-cyanoethyl-2-undecylimidazole, 1-cyanoethyl-2-phenylimidazole, 1-azine-2-methylimidazole, 1-azine-2-undecylimidazole, etc. are useful as such a catalyst.

It is preferable to use at least one of the above-mentioned basic heterocycle forming catalysts in an amount of 0.01 – 10% by weight based on the weight of the mixture of the isocyanate compound, the epoxyphenol compound and optionally the polyfunctional epoxy compound.

The present invention is further explained below referring to Examples which are not by way of limitation but by way of illustration.

EXAMPLE 1

250 Grams of methylenebis(phenylisocyanate) and 166 g of an epoxy compound represented by the formula,

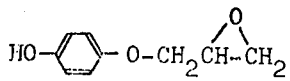

were charged into a 500 cc flask and reacted at 100°C for 1 hour with stirring. When the reaction mixture was cooled, a viscous liquid compound was obtained.

To the compound was added toluene to form a 80% solution, and 4 g of 1-benzyl-2-methylimidazole was added to produce a varnish.

A glass cloth (WE 18G 104BZ manufactured by Nitto Boseki Co., Ltd.) was impregnated with the varnish and dried at 120°C for 8 minutes. Ten sheets of the thus obtained prepreg were piled on one another and subjected to pressure forming at 160°C and 40 kg/cm$^2$ for 1 hour. Thus, a laminated board having a good appearance was obtained.

When the above-mentioned prepreg was allowed to stand at room temperature for 20 days and then subjected to pressure forming at 80 kg/cm$^2$, a laminated board having a good appearance was similarly obtained.

EXAMPLE 2

250 Grams of methylenebis(phenylisocyanate) and 135 g of an epoxyphenol compound represented by the formula,

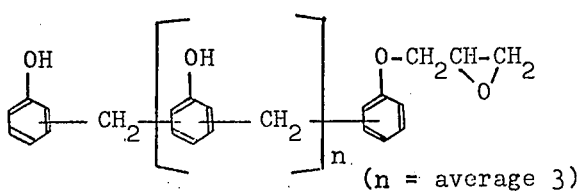

(n = average 3)

were reacted at 100°C for 1 hour with stirring. When the reaction mixture was cooled to ordinary temperature, a toluene-soluble resinous substance was obtained. It was dissolved in toluene to form a 50% solution, and 160 g of DER 332 (manufactured by Dow Chemical Corp., epoxy equivalent 174) as a bisphenol A epoxy resin and 3 g of 1-benzyl-2-methylimidazole were added to obtain a varnish. Equivalent ratios of OH group and epoxy group to isocyanate group were 0.5 : 1 and 0.5 : 1, respectively.

In the same manner as in Example 1, a glass cloth was impregnated with the aforesaid varnish and heated at 120°C for 8 minutes. The thus obtained prepreg was subjected to pressure forming at 160°C and 40 kg/cm$^2$ for 1 hour to obtain a laminated board.

Even after standing at room temperature for 20 days, the prepreg was able to be subjected to pressure forming at 80 kg/cm$^2$ and gave a laminated board having a good appearance.

EXAMPLE 3

250 Grams of methylenebis(phenylisocyanate) and 195 g of an epoxyphenyl compound represented by the formula,

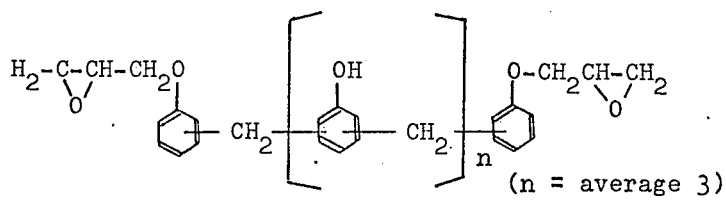

(n = average 3)

were reacted at 100°C for 1 hour with stirring. Equivalent ratios of OH group and epoxy group were 0.46 : 1 and 0.58 : 1, respectively. When the reaction mixture was cooled to ordinary temperature, a toluene-soluble resinous substance was obtained. It was dissolved in toluene to form a 60% solution, and 3 g of 1-benzyl-2-methylimidazole was added to obtain a varnish.

In the same manner as in Example 1, a glass cloth was impregnated with the varnish to produce a prepreg.

Even after standing at room temperature for 15 days, the prepreg was able to be subjected to pressure forming and gave a laminated board having a good appearance.

COMPARATIVE EXAMPLE 1

250 Grams of methylenebis(phenylisocyanate) and 160 g of DER 332 were dissolved in toluene to form a 80% solution, and 4 g of 1-benzyl-2-methylimidazole was added to obtain a varnish.

In the same manner as in Example 1, a glass cloth was impregnated with the varnish and dried at 120°C for 20 minutes to obtain a prepreg.

The prepreg was subjected to pressure forming at 160°C and 40 kg/cm$^2$ for 1 hour to obtain a laminated board.

After the prepreg was allowed to stand at room temperature for 5 days, it was pressed at 100°C and 80 kg/cm$^2$ for 1 hour. The resulting laminated board was not good since the flow of the resin was unsatisfactory and the laminated board became scratchy in some parts.

EXAMPLE 4

In the same manner as in Example 2, 250 g of methylenebis(phenylisocyanate) and 135 g of an epoxyphenol compound represented by the formula,

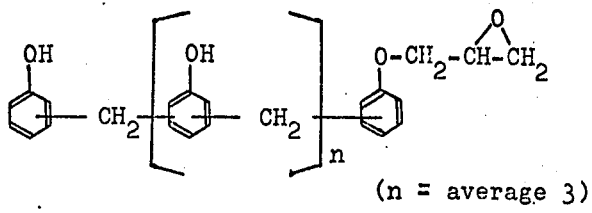

(n = average 3)

were reacted at 100°C for 1 hour with stirring. The reaction mixture was cooled to ordinary temperature to obtain a solid resin (A). The resin (A) was pulverized and 207 g of Epoxy ECN 1273 (a cresol novolac epoxy resin manufactured by Ciba Co.), 2 g of 1-azine-2-undecylimidazole, 1400 g of quartz glass powder (100 – 325 meshes) and 30 g of a wax (a mold releasing agent, Hoechst Wax, manufactured by Hoechst, Japan Co.) were then added. The mixture was rolled at 80°C for 7 minutes to obtain a B-stage molding powder. Equivalent ratios of OH group and epoxy group to isocyanate group were 0.47 : 1 and 0.31 : 1, respectively.

The molding powder showed a flow of 32 inches when its spiral flow was measured at 100 psi and 160°C. Also, when its spiral flow was measured under the same conditions after the molding powder was allowed to stand for 20 days, the molding powder showed a flow of 21 inches. Thus, the molding powder was very stable.

COMPARATIVE EXAMPLE 2

250 Grams of methylenebis(phenylisocyanate), 225 g of Epoxy ECN 1273, 2 g of 1-azine-2-undecylimidazole, 1110 g of quartz glass powder and 25 g of a wax were compounded. The mixture was rolled at 60°C for 20 minutes to obtain a B-stage molding material.

Directly after the above-mentioned rolling, the spiral flow of the material was 70 inches. However, when the material was allowed to stand at room temperature for 5 days, the flow of the material dropped to less than 10 inches. Thus, the material was unstable.

EXAMPLE 5

210 Grams of naphthylenediisocyanate and 135 g of an epoxyphenol compound represented by the formula,

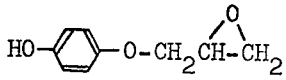

were melted at 120°C for about 1 hour to obtain a resin which was in the form of a solid at ordinary temperature.

90 Grams of Epoxy ECN 1273, 1 g of 1-azine-2-ethyl-4-methylimidazole, 1090 g of quartz glass powder and 17 g of a wax were then added to the resin. The mixture was rolled at 80°C for 5 minutes to obtain a B-stage molding powder. Equivalent ratios of OH group and epoxy group to isocyanate group were 0.4 : 1 and 0.6 : 1, respectively.

The molding powder showed a flow of 35 inches when the spiral flow thereof was measured by a transfer press at 100 psi and 170°C. When the molding powder was allowed to stand at room temperature for 20 days and its flow was then measured in the same manner as described above, the flow was found to be 20 inches. Thus, the molding powder was considerably stable.

EXAMPLE 6

188 Grams of xylenediisocyanate and 195 g of an epoxyphenol compound represented by the formula,

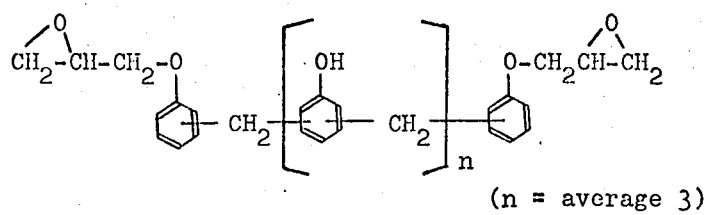

(n = average 3)

were reacted at 100°C for 1 hour with stirring. Equivalent ratios of OH group and epoxy group to isocyanate group were 0.5 : 1 and 0.5 : 1, respectively. The reaction mixture was cooled to ordinary temperature. The resulting toluene-soluble resinous substance was dissolved in toluene to form a 50% solution, and 0.5 g of 1-cyanoethyl-2-phenylimidazole was added. Thus, a varnish was obtained.

In the same manner as in Example 1, a glass cloth was impregnated with the varnish to prepare a prepreg. Even after standing at room temperature for 15 days, the prepreg was able to be subjected to pressure forming at 80 kg/cm² and gave a good laminated board.

As described above in detail, the shelf life of a resin composition containing an isocyanate compound at B-stage can be remarkably improved according to the present invention, and thereby a commercially very useful composition can be obtained.

What is claimed is:

1. A thermosetting resin composition comprising a reaction product of an isocyanate compound having a molecular weight of 100 to 2000 and containing at least two isocyanate groups in its molecule with an epoxyphenol compound which is represented by the formula, $$(HO)_n-R-\left(-CH_2-\underset{R_1}{C}-CH_2\right)_m$$

wherein R is a bi- or more valent group containing phenyl, $R_1$ is hydrogen, methyl or ethyl, m and n each are an integer of 1-8, and 0.01 to 10% by weight of a catalyst which forms an isocyanurate bond and an oxazolidone bond on curing, based on the weight of said reaction product, said isocyanate compound and said epoxyphenol compound being blended so that said OH group may be present in an amount of ⅓ to 1 equivalent per equivalent of said isocyanate group and said epoxy group may be present in an amount of one-fifth to two-thirds equivalent per equivalent of said isocyanate group and the resulting blend being heated to effect masking of at least part of the NCO groups and thereby form said reaction product.

2. A composition according to claim 1, wherein said catalyst is at least one selected from the group consisting of a tertiary amine a quaternary ammonium salt and an imidazole.

3. A composition according to claim 1, wherein the composition comprises further an epoxy compound containing at least two vicinal epoxy groups in its molecule and containing no OH group.

4. A composition according to claim 3, wherein said epoxy compound containing at least two vicinal epoxy groups in its molecule and containing no OH group is polyglycidylether of a phenol novolac.

5. A B-stage resin composition obtained by partially curing a thermosetting resin composition to form a resin composition having no three-dimensional structure, said thermosetting resin composition comprising a reaction product of an isocyanate compound having a molecular weight of 100 to 2000 and containing at least two isocyanate groups in its molecule with an epoxy-phenol compound which is represented by the formula,

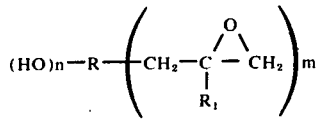

wherein R is a bi- or more valent group containing phenyl, $R_1$ is hydrogen, methyl or ethyl, m and n each are an integer of 1-8, and 0.01 to 10% by weight of catalyst which forms an isocyanurate bond and an oxazolidone bond on curing, based on the weight of said reaction product, said isocyanate compound and said epoxyphenol compound being blended so that said OH group may be present in an amount of ⅓ to 1 equivalent per equivalent of said isocyanate group and said epoxy group may be present in an amount of one-half to two-thirds equivalent per equivalent of said isocyanate group and the resulting blend being heated to effect masking of at least part of the NCO groups and thereby form said reaction product.

6. A composition according to claim 5, wherein said catalyst is at least one selected from the group consisting of a tertiary amine a quaternary ammonium salt and an imidazole.

7. A composition according to claim 5, wherein the composition comprises further an epoxy compound containing at least two vicinal epoxy groups in its molecule and containing no OH group.

8. A composition according to claim 7, wherein said epoxy compound containing at least two vicinal epoxy groups in its molecule and containing no OH group is polyglycidylether of a phenol novolac.

9. A composition according to claim 1, wherein masking of a NCO group is effected by the formation of a urethane bond.

10. A composition according to claim 1, wherein the blend is heated to a temperature from 100° to 120°C.

11. A composition according to claim 1, wherein said blend is heated to a temperature up to 100°C.

12. A resin composition obtained from the composition of claim 5, wherein the B-stage resin composition is cured at a temperature of at least 130°C.

13. A composition according to claim 5, wherein masking of a NCO group is effected by the formation of a urethane bond.

14. A composition according to claim 5, wherein the blend is heated to a temperature from 100° to 120°C.

15. A composition according to claim 5, wherein said blend is heated to a temperature up to 100°C.

16. A composition according to claim 2, wherein said quaternary ammonium salt is selected from the group consisting of cetyltrimethylammonium bromide, cetyltrimethylammonium chloride, dodecyltrimethylammonium iodide, trimethyldodecylammonium chloride, benzyldimethyltetradecylammonium chloride, benzyldimethylpalmitylammonium chloride, allylcoconut-trimethylammonium bromide, benzylmethylstearylammonium bromide, stearyltrimethylammonium chloride and benzyldimethyltetradecylammonium acetylate and said imidazole is selected from the group consisting of 2-methylimidazole, 2-ethylimidazole, 2-undecylimidazole, 2-heptadecylimidazole, 2-methyl-4-ethylimidazole, 1-butylimidazole, 1-propyl-2-methylimidazole, 1-benzyl-2-methylimidazole, 1-cyanoethyl-2-undecylimidazole, 1-cyanoethyl-2-phenylimidazole, 1-azine-2-methylimidazole, and 1-azine-2-undecylimidazole.

17. A composition according to claim 6, wherein said quaternary ammonium salt is selected from the group consisting of cetyltrimethylammonium bromide, cetyltrimethylammonium chloride, dodecyltrimethylammonium iodide, trimethyldodecylammonium chloride, benzyldimethyltetradecylammonium chloride, benzyldimethylpalmitylammonium chloride, allylcoconut-trimethylammonium bromide, benzylmethylstearylammonium bromide, stearyltrimethylammonium chloride and benzyldimethyltetradecylammonium acetylate and said imidazole is selected from the group consisting of 2-methylimidazole, 2-ethylimidazole, 2-undecylimidazole, 2-heptadecylimidazole, 2-methyl-4-ethylimidazole, 1-butylimidazole, 1-propyl-2-methylimidazole, 1-benzyl-2-methylimidazole, 1-cyanoethyl-2-undecylimidazole, 1-cyanoethyl-2-phenylimidazole, 1-azine-2-methylimidazole, and 1-azine-2-undecylimidazole.

18. A composition according to claim 1, wherein said epoxy phenol compound has a molecular weight of from 100 to 2000.

19. A composition according to claim 5, wherein said epoxy phenol compound has a molecular weight of from 100 to 2000.

20. A resin composition obtained from the composition of claim 13, wherein the B-stage resin is cured at a temperature that causes cleavage of said urethane bond and the formation of an oxazolidone ring and an isocyanurate ring.

21. A composition according to claim 2, wherein said tertiary amine is selected from the group consisting of trimethylamine, triethylamine, tetramethylbutanediamine, tetramethylpentanediamine and tetramethylhexanediamine.

22. A composition according to claim 1, wherein the epoxyphenol compound is selected from the group consisting of:

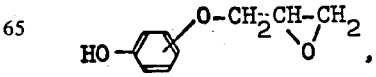

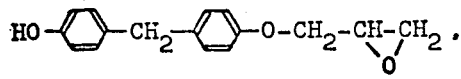

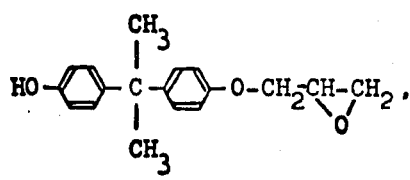
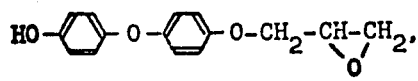
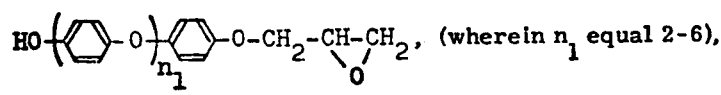 (wherein $n_1$ equal 2-6),
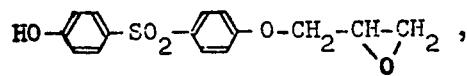
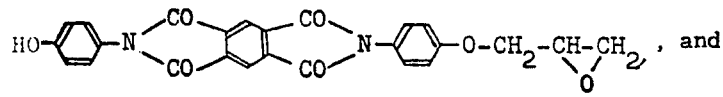, and
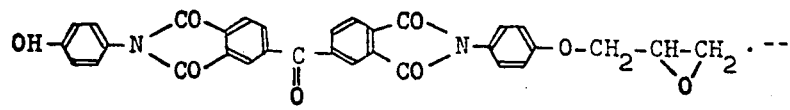
* * * * *